(12) United States Patent
Ogawa et al.

(10) Patent No.: US 6,500,342 B1
(45) Date of Patent: Dec. 31, 2002

(54) CHROMATOGRAPHIC SEPARATOR

(75) Inventors: Yuji Ogawa, Tokyo (JP); Kohei Sato, Tokyo (JP)

(73) Assignee: Organo Corporation, Tokyo (JP)

( * ) Notice: Subject to any disclaimer, the term of this patent is extended or adjusted under 35 U.S.C. 154(b) by 35 days.

(21) Appl. No.: 09/786,266
(22) PCT Filed: Jun. 30, 2000
(86) PCT No.: PCT/JP00/04388
§ 371 (c)(1),
(2), (4) Date: Mar. 2, 2001
(87) PCT Pub. No.: WO01/02849
PCT Pub. Date: Jan. 11, 2001

(30) Foreign Application Priority Data

Jul. 2, 1999 (JP) .......................... 11-188694

(51) Int. Cl.[7] .............................. B01D 15/08
(52) U.S. Cl. ................ 210/659; 210/198.2; 127/46.2
(58) Field of Search .................. 210/635, 656, 210/659, 198.2; 127/46.2

(56) References Cited

U.S. PATENT DOCUMENTS

| | | | | | |
|---|---|---|---|---|---|
| 5,071,547 A | * | 12/1991 | Cazer | ........................ | 210/659 |
| 5,223,143 A | * | 6/1993 | Masuda | ..................... | 210/659 |
| 5,391,299 A | * | 2/1995 | Masuda | ..................... | 210/659 |
| 5,534,075 A | * | 7/1996 | Miyawaki | .................. | 127/46.1 |
| 5,630,943 A | * | 5/1997 | Grill | ........................... | 210/659 |
| 5,635,072 A | * | 6/1997 | Moran | ........................ | 210/659 |
| 5,705,061 A | * | 1/1998 | Moran | ........................ | 210/659 |
| 6,099,654 A | * | 8/2000 | Kaneko | ..................... | 127/46.2 |
| 6,146,534 A | * | 11/2000 | Grendze | ..................... | 210/635 |
| 6,224,683 B1 | * | 5/2001 | Tanikawa | .................. | 127/46.3 |
| 6,328,895 B1 | * | 12/2001 | Masuda | ...................... | 210/659 |
| 6,331,250 B1 | * | 12/2001 | Kaneko | ..................... | 210/635 |
| 6,395,179 B1 | * | 5/2002 | Grendze | ..................... | 210/659 |
| 6,409,922 B1 | * | 6/2002 | Kaneko | ..................... | 210/659 |

FOREIGN PATENT DOCUMENTS

| | | | | |
|---|---|---|---|---|
| JP | 7-68101 | 3/1995 | ................ | 210/659 |
| JP | 8-141311 | 4/1996 | ................ | 210/659 |
| JP | 2000-162198 | 6/2000 | ................ | 210/659 |

* cited by examiner

Primary Examiner—Ernest G. Therkorn
(74) Attorney, Agent, or Firm—Sughrue Mion, PLLC

(57) ABSTRACT

A chromatographic separator allows a feed liquid material consisting of two or more than two components and a liquid eluent to circulate within an endless circular path 16, wherein columns 14 are coupled to one another, to separate the feed liquid material into two components. The selector valves 23 and 33 are switched to allow pumps 20 and 30 to serve to circulate the fluid through the circular path 16 and to inject each liquid from the tanks 25 and 35. Furthermore, an ordinary ON/OFF valve is used as discharge valves 41 and 51 for each of the liquids and thus the pressure specification required for the circular path 16 is reduced.

4 Claims, 8 Drawing Sheets

Fig. 2

| Step | Step name | First selector valve | First pump | Valve 41 | Second selector valve | Second pump | Valve 51 | Time (second) |
|---|---|---|---|---|---|---|---|---|
| 1 | Introduction of D, Discharge of A | Circulation | Run | Open | Injection | Run | Close | 20 |
| 2 | Introduction of F, Discharge of A | Injection | Run | Open | Injection | Stop | Close | 20 |
| 3 | Circulation | Circulation | Run | Close | Circulation | Run | Close | 40 |
| 4 | Introduction of D, Discharge of C | Circulation | Stop | Close | Injection | Run | Open | 40 |
| 5 | Rotation of separation columns | Circulation | Stop | Close | Circulation | Stop | Close | 5 |

CHROMATOGRAPHIC SEPARATOR

REFERENCE TO RELATED APPLICATIONS

This application is a 371 of PCT/JP00/04388 filed Jun. 30, 2000.

FIELD OF THE INVENTION

The present invention relates to a chromatographic separator and more particularly to the control of circular paths and pumps in an intermittently-moving-bed chromatographic separator and a simulated moving-bed chromatographic separator.

BACKGROUND OF THE INVENTION

In manufacturing industries such as the sugar industry or the pharmaceutical industry, chromatographic separators are widely used to extract one or more components from fluid of a crude material consisting of a plurality of components and obtained from nature or through chemical reactions. Among the chromatographic separators, a variety of moving-bed separators have been proposed other than the batch fixed-bed separators conventionally used.

FIG. 8 is a schematic cross-sectional view illustrating a separation vessel, showing the principle of a typical chromatographic separator employing the moving-bed scheme. The separation vessel 60 is filled with a filler (adsorbent) 62 in advance, and is full of liquid eluent. A feed liquid material including two species of components A and C is introduced from a feed liquid material supply port F, and the liquid eluent is supplied from a liquid eluent supply port D at a constant linear speed. Each of the components A and C moves at different linear speeds within the separation vessel 60 due to the difference in affinity for the filler. For example, the component A having a lower affinity moves at a higher linear speed, whereas the component C having a higher affinity moves at a lower linear speed. Accordingly, by discharging the circulating liquid from two appropriate positions, the feed liquid material can be separated into a liquid containing more of the component A (hereinafter simply referred to as the component A) and a liquid containing more of the component C (hereinafter simply referred to as the component C).

A chromatographic separator employing the moving-bed scheme creates the movement of the filler, in the direction opposite to the flow of the liquid eluent, at a speed between the speed of movement of the component A and that of the component C. As shown in the figure, this makes it possible to take out the components at respective positions across the supply position of the feed liquid material. That is, as viewed from the direction of the flow of the circulating liquid, the component A can be taken out behind the feed liquid material supply position F and the component C can be taken out in front of the feed liquid material supply position F. In this scheme, since it is difficult to allow the filler to move at a uniform speed, it is rather difficult to use this scheme in any commercial applications.

A separator has been in practical use which is capable of obtaining the separation performance equivalent to that of a separator of the foregoing moving-bed scheme theoretically conceived, without allowing the filler to move. FIG. 9 illustrates the principle of this type of separator. In this scheme, the separation vessel 60 is divided into a plurality of columns 64 (twelve columns in the example of the figure), which are coupled to form an endless circular path. Instead of the movement of the filler, the supply positions of the feed liquid material F and the liquid eluent D and the discharge positions of the components A and C are shifted in the direction of flow of the liquid eluent. As time elapses, the distribution of the liquid in the system is shifted in the direction of the circulating liquid. When the concentration distribution has been shifted by a distance corresponding to one column after a certain period of time, the supply positions of the feed liquid material and the liquid eluent and the discharge positions of the components A and C are shifted in the direction of the circulating liquid by the distance corresponding to one column. The repetition of this operation makes it possible to supply and discharge each of the liquids at the optimum position at any time. Three schemes are employed to shift the supply positions of the feed liquid material and the liquid eluent and the discharge positions of the components A and C. The schemes, now in practical use, include a simulated moving-bed scheme in which liquid injection valves and liquid discharge valves, such as electromagnetic valves, are assembled and switched sequentially; another simulated moving-bed scheme in which a rotary valve having a number of nozzles is used and an intermittently-moving-bed scheme in which a rotary valve having a number of nozzles is used while moving the columns.

To drive a fluid in a chromatographic separator having the foregoing endless circular path, a drive force is typically provided by means of an injection pump for a feed liquid material and an injection pump for a liquid eluent. In addition, a drive force is also provided, for example, by means of one or more circulation pumps disposed in the circular path. Here, it is necessary to maintain the equality between the total amount of the feed liquid material and the liquid eluent, injected into the circular path, and the total amount of components A and C, discharged from the circular path, at any time to prevent a pressure fluctuation in the circular path. Thus, some of the pumps used therein have a constant rate property, and in some cases, a flow rate control mechanism is employed in addition thereto. However, the pump having the constant rate property or the flow rate control mechanism is expensive, and thus the cost for the chromatographic separator increases.

Furthermore, many of the separators employ back pressure regulating valves, which are adapted to open when the pressure of the circular path has been increased, in order to keep the pressure of the circular path at a specified value with accuracy. For example, these values are used in the discharge lines for the component C. In this case, the pressure within the circular path system is not lower than the one that is set for the back pressure regulating valves, thus necessitating columns or pumps which are capable of withstanding this pressure. Use of the columns and pumps having such a pressure specification further raises the cost of the chromatographic separator.

SUMMARY OF THE INVENTION

In view of the above, it is an object of the present invention to reduce a number of pumps in a chromatographic separator which employs the simulated moving-bed scheme or the intermittently-moving-bed scheme, and at the same time to reduce pressure in the circular path by eliminating the back pressure regulating valve, while keeping the pressure of the circular path at a specified value, thereby reducing the equipment cost of the chromatographic separator while allowing the separation performance thereof to remain unchanged.

The present invention provides, in a preferred embodiment is thereof, a chromatographic separator including: at least four columns consecutively coupled together to form a circular path for circulating a liquid mixture by coupling an outlet port of one of the columns to an inlet port of an adjacent one of the columns, the circular path having a first injection port for introducing a feed liquid material including at least first and second components, a second injection port for introducing an liquid eluent, a first discharge port for discharging the first component and a second discharge port for discharging the second component; a port switching member for sequentially switching the first and second injection ports and the first and second discharge ports toward downstream of the circular path; first and second pumps having delivery ports coupled to the circular path via the port switching member at respective positions in association with each other; a first selector valve having a first select position for connecting the first pump in the circulating path and a second select position for allowing the first pump to inject the feed liquid material; and a second selector valve having a third select position for connecting the second pump in the circulating path and a fourth select position for allowing the second pump to inject the liquid eluent.

In accordance with the chromatographic separator of the present invention, movement of the liquid mixture (a circulating liquid) containing the feed liquid material and the liquid eluent in the circular path, injection of the feed liquid material and the liquid eluent into the circular path, and discharge of the first and second components from the circular path can be performed by switching the first selector valve and the second selector valve and driving the first and second pumps. Accordingly, the number of pumps employed in the chromatographic separator can be reduced down to two. In addition, each component can be discharged by means of ordinary valves without using a back pressure regulating valve, thereby allowing the pressure specification within the circular path system to be reduced.

The chromatographic separator according to the present invention is applicable to any one of the simulated moving-bed chromatographic separator and the intermittently-moving-bed chromatographic separator.

BRIEF DESCRIPTION OF THE DRAWINGS

FIG. 2 is a table showing the operational state of each portion at each step of the chromatographic separator of FIG. 1.

PREFERRED EMBODIMENT OF THE INVENTION

Figure 1:
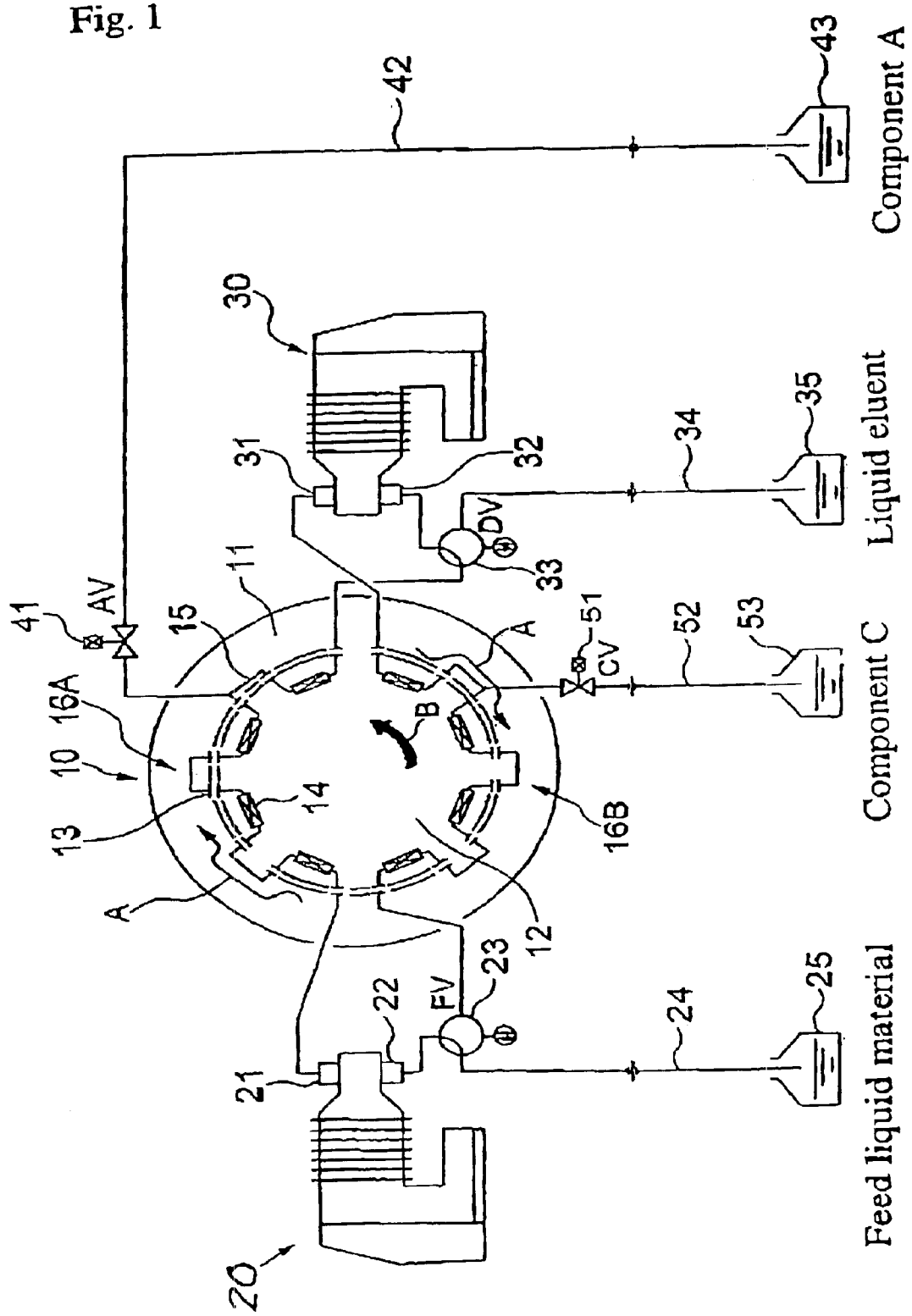
FIG. 1 is a schematic block diagram illustrating the configuration of a moving-bed chromatographic separator according to an embodiment of the present invention.

Now, the present invention will be described in more detail in accordance with an embodiment of the present invention with reference to the drawings. FIG. 1 is a schematic block diagram illustrating the configuration of an intermittently-moving-bed chromatographic separator hereinafter also referred to as separator) according to an embodiment of the present invention. The separator has two pumps 20 and 30 and is provided with selector valves 23 and 33 for selecting either a circulation mode for connecting each of the pumps into a circular path or a liquid injection mode for coupling a liquid injection tube to the suction port of each pump.

In one of the operational steps of the separator, the first and second selector valves 23 and 33 are selected for the circulation mode, whereby eight columns 14 having an adsorbent filled therein are coupled to one another via each of nozzles 13 of a rotary valve 10 and the first and second pumps 20 and 30 to thereby form an endless circular path 16. The liquid flows within the circulation path 16 in the direction "A" as shown in the figure (in the clockwise direction). The first and second pumps 20 and 30 serve as constant rate pumps which provide the same flow rate for the liquid.

The circular path 16 includes a first circular path half 16A including the first to fourth columns 14 from the delivery port 21 of the first pump to the suction port 32 of the second pump 30, as viewed in the direction "A" of the liquid flow, and a second circular path half 16B including the fifth to eighth columns 14 from the delivery port 31 of the second pump 30 to the suction port 22 of the first pump 20. A feed liquid material tank 25 is coupled to the suction side 22 of the first pump 20 via a feed liquid material injection tube 24 and the first selector valve 23, and coupled to one end of the first circular path half 16A via the first pump 20. A liquid eluent tank 35 is coupled to the suction port 32 of the second pump 30 via a liquid eluent injection tube 34 and the second selector valve 33, and coupled to one end of the second circular path half 16B via the second pump 30. The feed liquid material injection tube 24 and the liquid eluent injection tube 34 are coupled to the circular path 16 to inject a feed liquid material or a liquid eluent therethrough when the corresponding selector valve 23 or 33 is switched to the liquid injection mode.

A discharge tube 42 for discharging the component A is coupled to the tube that couples the outlet port of the third column 14 to the inlet port of the fourth column 14 in the first circular path half 16A via a discharge valve 41 for the component A, and the end thereof is coupled to a tank 43 for the component A. A discharge tube 52 for discharging the component C is coupled to the tube that couples the outlet port of the third column 14 to the inlet port of the fourth column 14 in the second circular path half 16B via a discharge valve 51 for the component C, and the end thereof is coupled to a tank 53 for the component C.

The rotary valve 10 has a hollow cylindrical stationary member 11, and a cylindrical rotary member 12 disposed rotatably therein and having an outer wall sliding over the inner wall of the stationary member 11. The rotary member 12 mounts thereon the eight columns 14, each column 14 being shifted by a distance corresponding to one column per one rotational movement during the intermittent rotation of the rotary member 12. When the rotary valve 10 is at a standstill, the inlet and outlet ports of each of the columns 14 are coupled to the outlet port of the preceding column 14 and to the inlet port of the following column 14, respectively, in each of the circular path half 16A and 16B via respective nozzles 13 of the rotary valve 10.

FIG. 2 lists the operational state of the separator at each step. The separator repeats the following step sequentially. The steps include a first step, which lasts for about 20 seconds, for injecting the liquid eluent and discharging the component A, a second step, which lasts for about 20 seconds, for injecting the feed liquid material and discharging the component A, a third step, which lasts for about 40 seconds, for circulating the internal liquid, a fourth step, which lasts for about 40 seconds, for injecting the liquid eluent and discharging the component C, and a fifth step, which lasts for about 5 seconds, for bringing the internal liquid flow into a standstill while moving the rotary valve 10 together with the columns 14 (the separation vessels) by the distance corresponding to one column.

Figure 3:
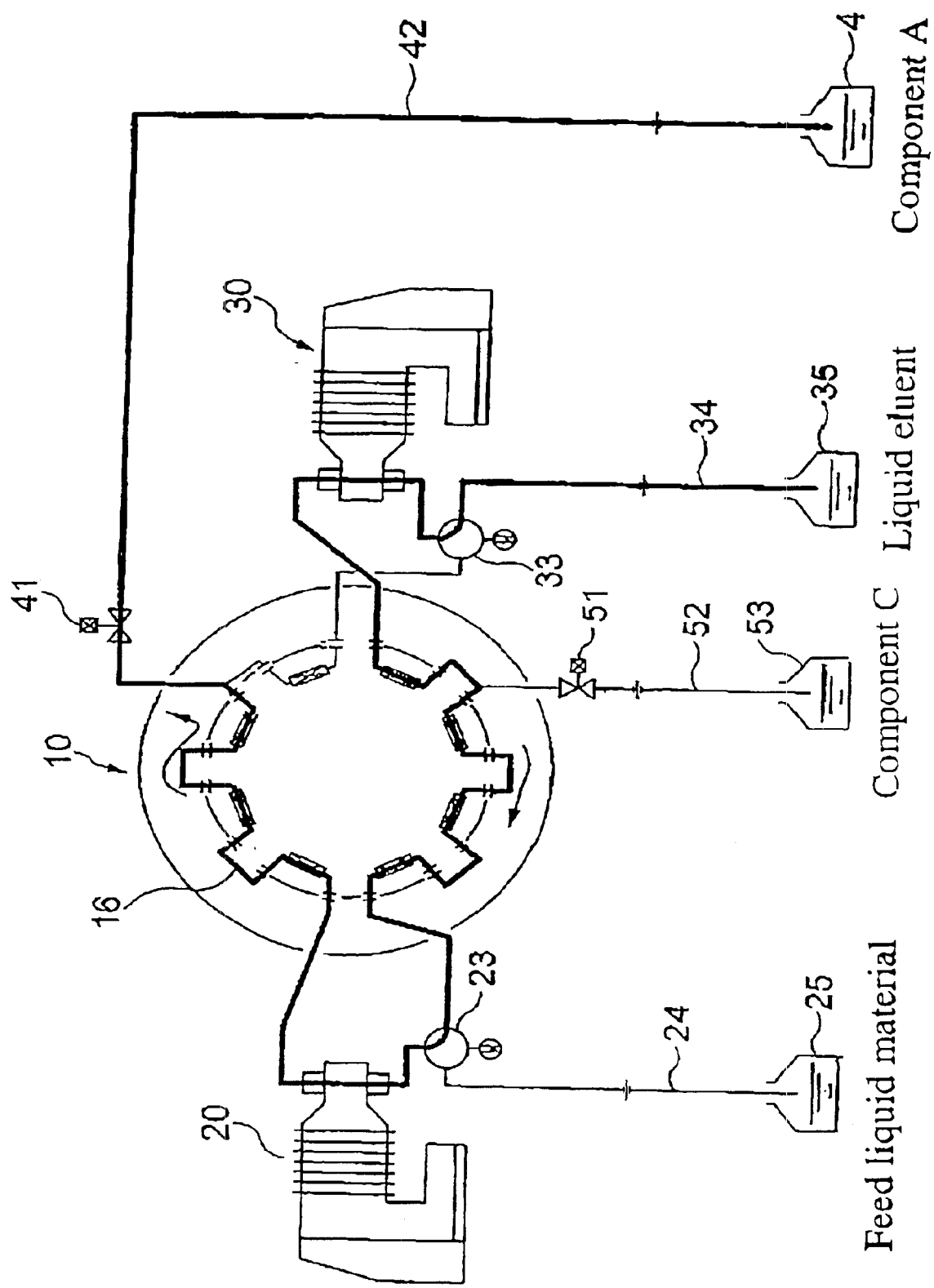
FIG. 3 is a schematic diagram illustrating the flow of a liquid of the chromatographic separator in the first step shown in FIG. 2.

FIG. 3 illustrates the state of each portion of the separator in the first step (the liquid eluent injection and component A discharge mode). With the first selector valve 23 being placed in the circulation mode, the second selector valve 33 being placed in the liquid injection mode, the discharge valve 41 being opened, and the discharge valve 51 being closed, the pumps 20 and 30 are operated. Thus, while the liquid eluent is being introduced, the component A is discharged in the same amount as that of the liquid eluent introduced.

Figure 4:
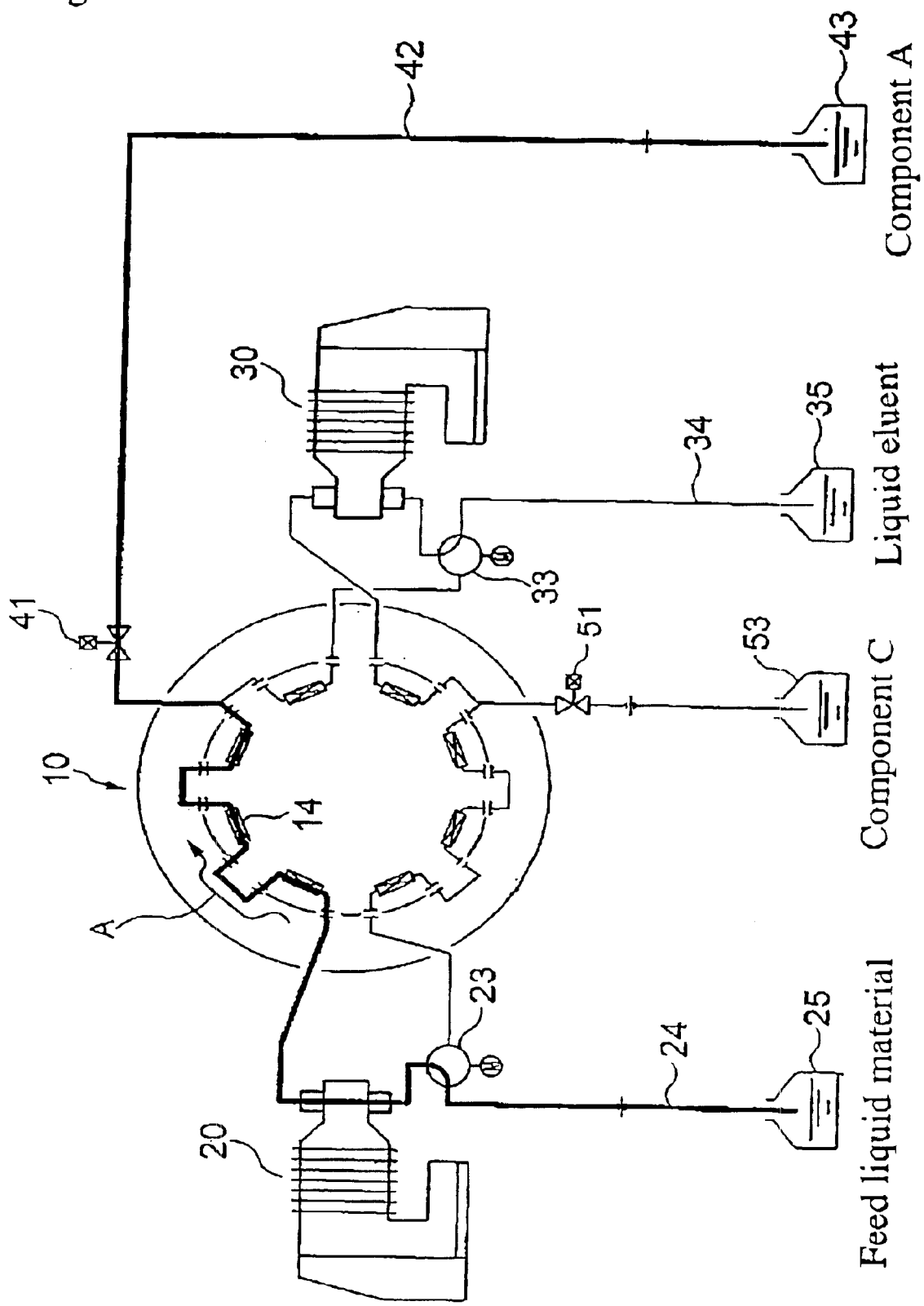
FIG. 4 is a schematic diagram illustrating the flow of a liquid of the chromatographic separator in the second step shown in FIG. 2.

Then, the selector valve 23 is switched to the liquid injection mode with the discharge valves 41 and 51 being unchanged, and the second pump 30 is stopped, thereby shifting into the second step (the feed liquid material injection and the component A discharge mode), as shown in FIG. 4. In this step, while the feed liquid material is being introduced from the tank 25, the component A is discharged into the tank 43 for the component A via the discharge line 42.

Figure 5:
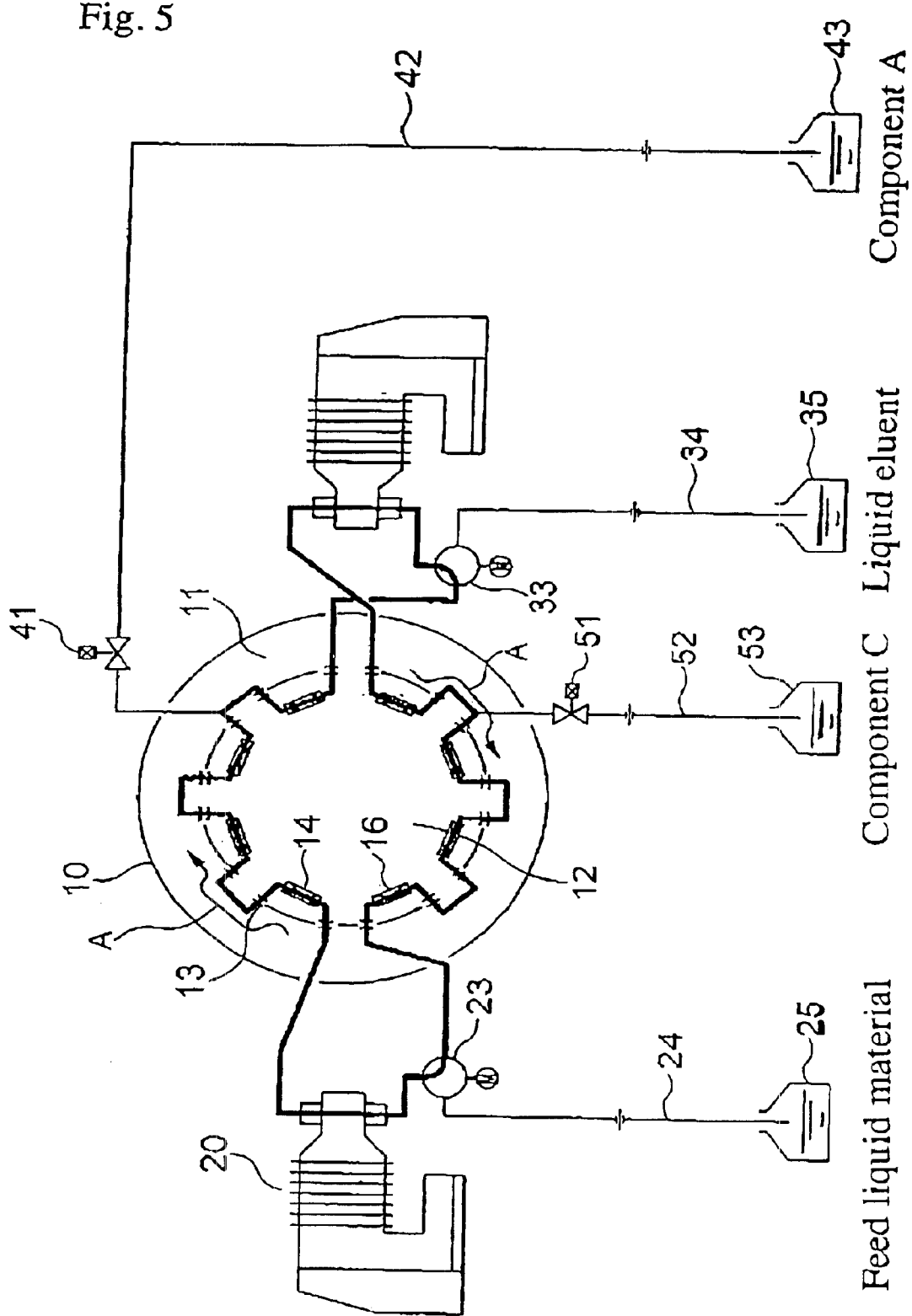
FIG. 5 is a schematic diagram illustrating the flow of a liquid of the chromatographic separator in the third step shown in FIG. 2.

Subsequently, as shown in FIG. 5, both the first and second selector valves 23 and 33 are placed in the circulation mode, with the valves 41 and 51 being closed, and the first and second pumps 20 and 30 are then operated to shift into the liquid circulation mode (the third step). In this mode, the internal liquid containing the feed liquid material and the liquid eluent is allowed to circulate within the circular path by means of at least one of the two pumps 20 and 30 to separate the feed liquid material into the component C having a high affinity for the adsorbent inside each column and the component A having a low affinity for the adsorbent. The peak of the concentration distribution of each component thereby becomes higher to provide a suitable condition for discharging the components A and C.

Figure 6:
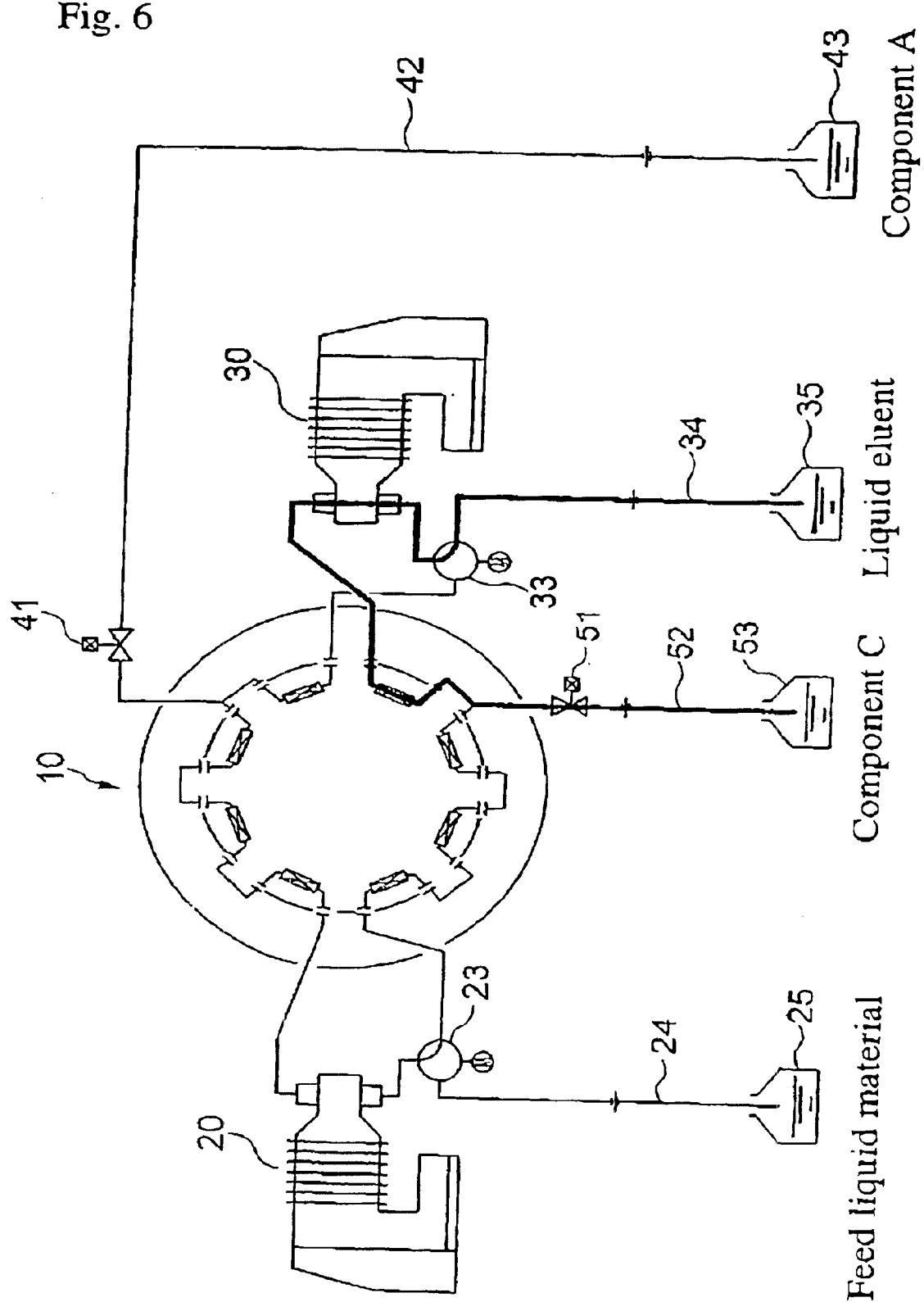
FIG. 6 is a schematic diagram illustrating the flow of a liquid of the chromatographic separator in the fourth step shown in FIG. 2.

Thereafter, the first pump 20 is stopped with the discharge valve 41 remaining closed. Next, the discharge valve 51 is opened and the second selector valve is switched to the liquid injection mode, thereby shifting into the fourth step shown in FIG. 6 (the liquid eluent injection and component C discharge mode). In this mode, while the liquid eluent is being introduced, the component C is discharged immediately downstream of the point of the liquid eluent introduction. Du to the process scheme that both the pumps 20 and 30 have the same capacity, and that the first step continues for 20 seconds, the second step continues for 20 seconds, and the fourth step continues for 40 seconds, the liquids are introduced into the circular path so that the ratio between the amounts of feed liquid material and the liquid eluent is 1:3. At the end of this mode, the peaks of the density distributions of the components A and C have been shifted by the distance corresponding to one column toward downstream of the peaks at the start of the first step.

Figure 7:
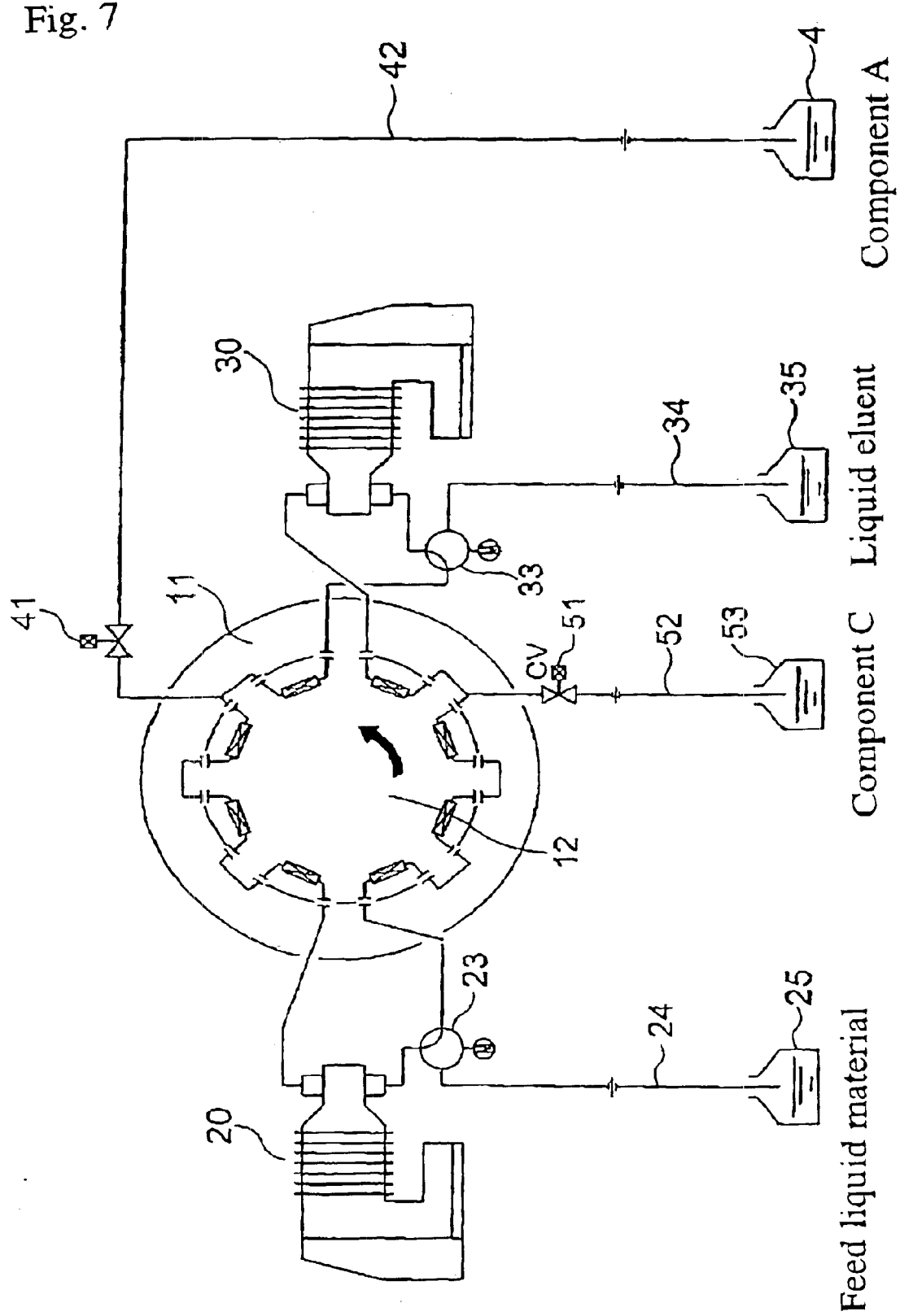
FIG. 7 is a schematic diagram illustrating the flow of a liquid of the chromatographic separator in the fifth step shown in FIG. 2.
Figure 8:
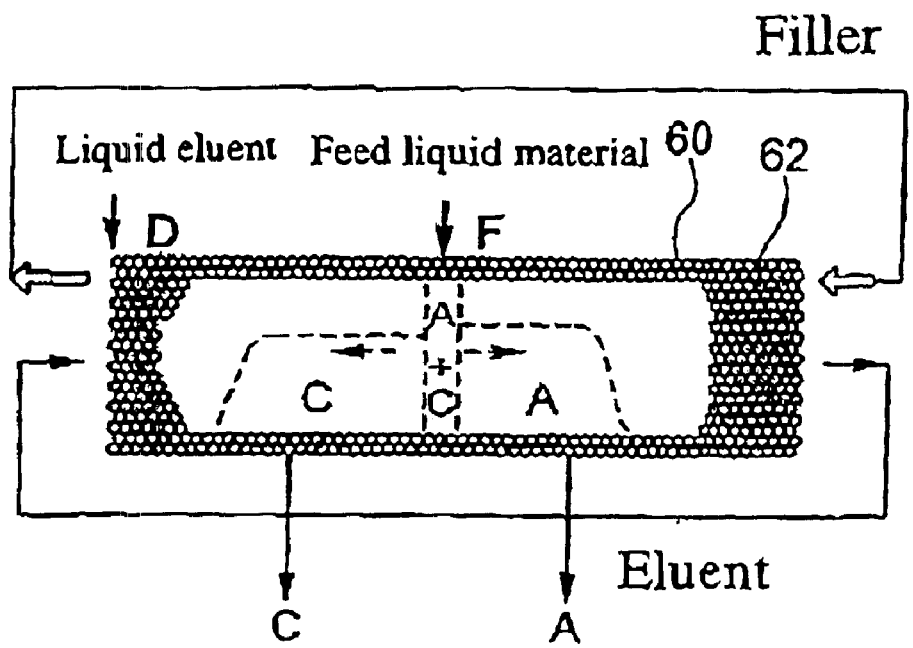
FIG. 8 is a schematic cross-sectional view of a separation vessel, showing the principle of a typical moving-bed chromatographic separator.
Figure 9:
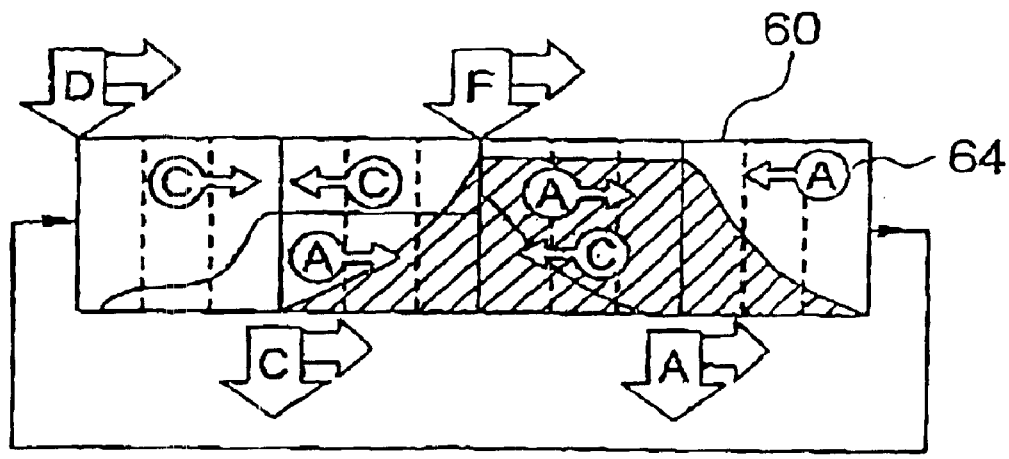
FIG. 9 is a schematic cross-sectional view of a separation vessel, showing the principle of a typical quasi-moving-bed chromatographic separator.

Subsequently, both the two pumps 20 and 30 are stopped, the selector valves 23 and 33 are switched to the circulation mode, and both the discharge valves 41 and 51 are closed, thereby shifting into the fifth step shown in FIG. 7. In this mode, the rotary member 12 of the rotary valve 10 mounting thereon the columns 14 is merely rotated by the distance corresponding to one column in the counter clockwise direction. The combination between the nozzles of the stationary member 11 and the nozzles of the rotary member 12 is thereby shifted to the subsequent column position. Thus, as viewed from the side of the columns, the injection ports for introducing the feed liquid material and the liquid eluent into the circular path 16 and the positions for discharging both the components from the circular path 16 are shifted toward downstream by the distance corresponding to one column. Thereafter, the mode shifts to the first step shown in FIG. 3, whereby the component A is discharged while injecting the liquid eluent by the pump 30. Each of the steps is repeated hereafter sequentially so that the feed liquid material containing two or more than two components is separated into two components A and C to be extracted.

In the above embodiment, the selector valves 23 and 33 are selected to switch the connection for the two pumps 20 and 30, thereby activating each of the pumps 20 and 30 as a circulation pump on one occasion or as a liquid injection pump on the other ocasion. This affords reduction of the number of pumps and reduces the equipment cost for the chromatographic separator. In addition, the pressure fluctuation within the circular path can be suppressed without using the back pressure regulating valve, whereby a low-pressure specification can be selected for the devices in the circular path for further reducing the equipment cost for the chromatographic separator.

The present invention has been described above in accordance with the preferred embodiment. However, the chromatographic separator according to the present invention is not limited to the configuration scheme of the embodiment described above. Various alterations and modifications to the configuration scheme of the foregoing embodiment of the embodiment are also included in the scope of the present invention.

INDUSTRIAL APPLICABILITY

The chromatographic separator according to the present invention is suitable for extracting one or more components from a feed liquid material consisting of a plurality of components and obtained from nature or through chemical reactions.

What is claimed is:

1. A chromatographic separator comprising:
    at least four columns consecutively coupled together to form a circular path for circulating a liquid mixture by coupling an outlet port of one of said columns to an inlet port of an adjacent one of said columns, said circular path having a first injection port for introducing a feed liquid material including at least first and second components, a second injection port for introducing an liquid eluent, a first discharge port for discharging said first component and a second discharge port for discharging said second component;

a port switching member for switching said first and second injection ports and said first and second discharge ports toward downstream of said circular path;

first and second pumps having delivery ports coupled to said circular path via said port switching member at respective positions in association with each other;

a first selector valve having a first select position for connecting said first pump in said circulating path and a second select position for allowing said first pump to introduce the feed liquid material; and a second selector valve having a third select position for connecting said second pump in said circulating path and a fourth select position for allowing said second pump to introduce the liquid eluent.

2. The chromatographic separator as defined in claim 1, adapted to operate with the following consecutive steps:

a first step wherein said first and second selector valves are in said first select position and said fourth select position, respectively, and at least one of said first and second pumps is operated to introduce said liquid eluent and discharge said first component;

a second step wherein said first selector valve is in said second select position, and said first pump is operated to introduce said feed liquid material and discharge said first component;

a third step wherein said first and second selector valves are in said first and third select positions, respectively, and at least one of said first and second pumps is operated to circulate the liquid mixture;

a fourth step wherein said second selector valve is in a fourth select position, and said second pump is operated to introduce said liquid eluent and discharge said second component; and a fifth step wherein said port switching member shifts said first and second injection ports and said first and second discharge ports toward downstream of said circular path by a distance corresponding to one of said columns.

3. The chromatographic separator as defined in claim 1, wherein said port switching member includes a rotary valve.

4. A chromatographic separator comprising:

at least four columns each having an inlet port and an outlet port;

a rotary valve including a stationary member having a substantially cylindrical surface mounting thereon a plurality of stationary nozzles, and a rotary member having a rotary surface slidably rotating on said cylindrical surface intermittently at a specified timing, said rotary surface mounting thereon rotary nozzles intermittently communicated with said stationary nozzles, said rotary member supporting said columns en bloc so that said rotary nozzles are communicated with said inlet ports and said outlet ports, said stationary nozzles being coupled by a tube assembly to couple said columns in two groups forming a first circular path half and a second circular path half;

first and second injection tubes for introducing a feed liquid material including at least two components and for introducing a liquid eluent, respectively;

a first pump having a delivery port coupled to a first end of said first circular path half and a suction port;

a first selector valve for selectively coupling said suction port of said first pump with a first end of said second circular path half or said first injection tube;

a second pump having a delivery port coupled to a second end of said second circular path half and a suction port;

a second selector valve for selectively coupling said suction port of said second pump with a second end of said first circular path half or second injection tube;

a first discharge tube coupled to said first circular path half to discharge one of said two components from said first circular path half; and a second discharge tube coupled to said second circular path half to discharge the other of said two components from said second circular path half.

\* \* \* \* \*